United States Patent
Kong et al.

(10) Patent No.: US 10,084,382 B2
(45) Date of Patent: Sep. 25, 2018

(54) ADAPTIVE VALLEY MODE SWITCHING

(71) Applicant: DIALOG SEMICONDUCTOR INC., Campbell, CA (US)

(72) Inventors: Pengju Kong, Campbell, CA (US); Hien Bui, Campbell, CA (US); Duc Doan, Campbell, CA (US); Cong Zheng, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/825,042

(22) Filed: Nov. 28, 2017

(65) Prior Publication Data
US 2018/0083538 A1 Mar. 22, 2018

Related U.S. Application Data

(63) Continuation of application No. PCT/US2015/057428, filed on Oct. 26, 2015.

(51) Int. Cl.
*H02M 3/158* (2006.01)
*H02M 1/44* (2007.01)
*H02M 3/335* (2006.01)

(52) U.S. Cl.
CPC ........... *H02M 3/1582* (2013.01); *H02M 1/44* (2013.01); *H02M 3/33523* (2013.01)

(58) Field of Classification Search
CPC ... H02M 3/1582; H02M 1/44; H02M 3/33523
See application file for complete search history.

(56) References Cited

U.S. PATENT DOCUMENTS

| | | | |
|---|---|---|---|
| 2008/0049457 A1 | 2/2008 | Choi et al. | |
| 2010/0315062 A1* | 12/2010 | Hung | G01R 19/0084 324/102 |
| 2010/0315838 A1 | 12/2010 | Mao et al. | |
| 2012/0320632 A1* | 12/2012 | Kalodka | H02M 3/33507 363/16 |
| 2013/0121049 A1 | 5/2013 | Shi et al. | |
| 2014/0268918 A1* | 9/2014 | Gong | H02M 7/217 363/21.15 |
| 2016/0126846 A1* | 5/2016 | Ferrazza | H02M 3/33507 363/21.12 |
| 2017/0012539 A1* | 1/2017 | Chen | H02M 3/33523 |

FOREIGN PATENT DOCUMENTS

WO    WO 2009/128023    10/2009

OTHER PUBLICATIONS

PCT Search Report and Written Opinion dated Jul. 21, 2016 from corresponding International Application No. PCT/US2015/057428 filed Oct. 26, 2015.

* cited by examiner

*Primary Examiner* — Adolf Berhane
*Assistant Examiner* — Bart Iliya
(74) *Attorney, Agent, or Firm* — Haynes and Boone, LLP

(57) ABSTRACT

An adaptive valley mode switching power converter is provided that switches on a power switch within valley periods of a resonant voltage oscillation for the power switch. Each valley period is determined with regard to a valley threshold voltage.

16 Claims, 6 Drawing Sheets

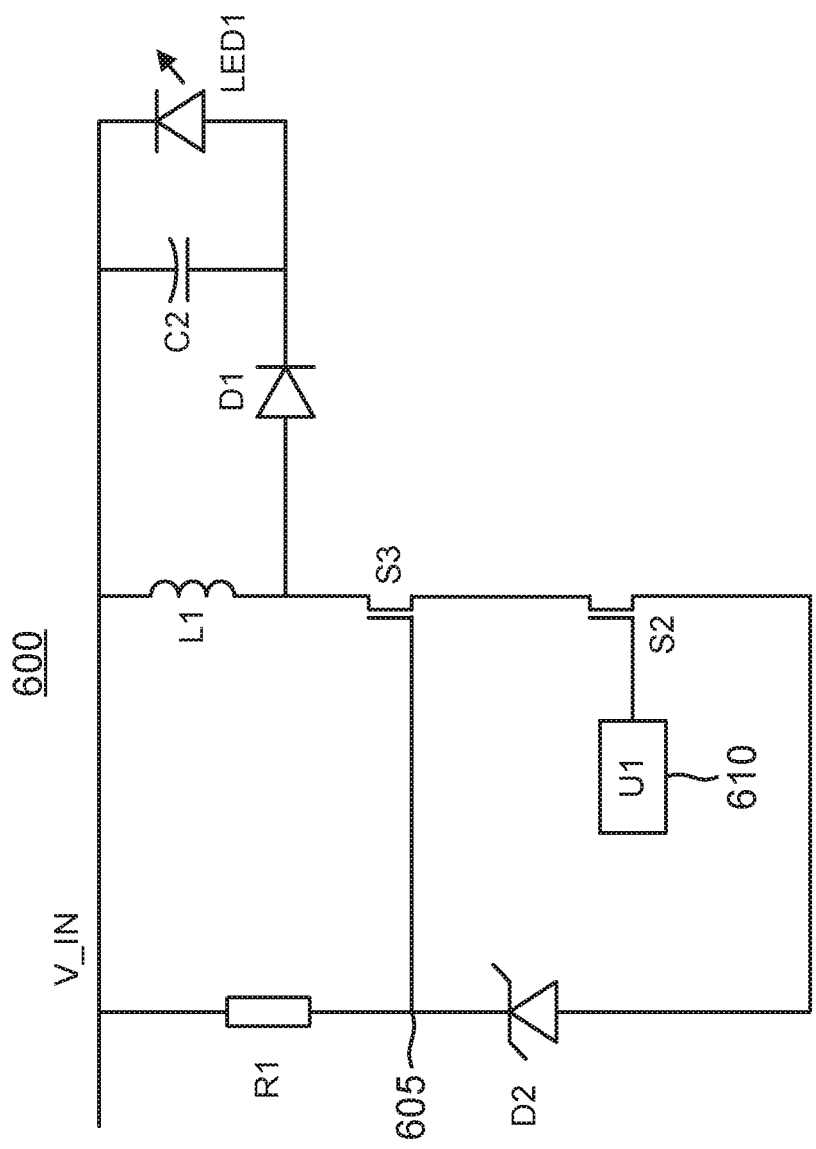

ADAPTIVE VALLEY MODE SWITCHING

CROSS-REFERENCE TO RELATED APPLICATIONS

This application is a continuation of International Application No. PCT/US2015/057428 filed Oct. 26, 2015, which is hereby incorporated by reference in its entirety.

TECHNICAL FIELD

This application relates to switching power converters, and more particularly to a switching power converter with adaptive valley mode switching.

BACKGROUND

Switching power converters offer higher efficiency as compared to linear regulators. Although linear regulators are relatively inexpensive, they regulate a lower output voltage from a higher input voltage by simply burning the difference as heat. As a result, a linear regulator typically burns more power than is actually supplied to the load. In contrast, a switching power converter regulates its output voltage by delivering relatively small increments of energy through the cycling of a power switch. The power switch in a switch-mode device is either off or on such that efficiency is markedly improved as compared to linear regulators. However, a power switch transistor does dissipate energy as it transitions from off to on and from on to off. This energy dissipation is proportional to the current and voltage being switching through the transistor. In addition, large rates of change for voltage and current through the power switch stress the device and cause significant electromagnetic interference (EMI).

To reduce the switching losses, device stress, and EMI, it is conventional to exploit the resonant voltage ringing that occurs across the power switch transistor when it is cycled off. The resonant voltage ringing causes the switch voltage to cycle through local minimums that are denoted as voltage valleys. A switching scheme that switches on the power switch at these local minimums is thus denoted as a valley-mode switching scheme. The resulting voltage waveforms for an example switching power converter configured to implement valley-mode switching are shown in FIG. 1A through 1C. FIG. 1A illustrates the on and off periods for a power switch S1, which is cycled on at a time t1 and cycled off at a time t2. The corresponding drain voltage for power switch S1 is shown in FIG. 1B. When the power switch S1 is switched on at time t1, the drain voltage is grounded but rebounds high at time t2 when the power switch is again switched off. The corresponding secondary winding current is shown in FIG. 1C. At time t2, the secondary current goes from zero to a maximum value. The stored energy is then delivered to the load as the secondary current ramps down to zero at a subsequent transformer reset time (trst). At this point, the resonant oscillations begin on the drain voltage for the power switch S1. The resonant oscillation has local minimums at times t3, t4, t5, and t6. The corresponding controller for power switch S1 then selects one of these minimums for the subsequent switch on time. For example, power switch S1 may again be cycled on at time t6 since this time is also a valley minimum.

In a control loop having a relatively constant pulse repetition frequency, the controller would tend to turn on the power switch S1 at substantially the same rate in each switching cycle. The result is that the EMI switching noise is concentrated at the principle switching frequency 200 and its harmonics 201 and 202 as shown in FIG. 2. To reduce the magnitude of the EMI at these peaks, it is thus conventional to dither the valley mode switching. For example, suppose that the controller's desired pulse on time falls between the valley minimums at times t4 and t5 in FIG. 1B. A controller with frequency dithering would then skip valleys and turn on power switch S1 at the subsequent valley at time t6. This valley skipping would be performed on a random basis so that the EMI noise is spread across the frequency spectrum as shown for dithered spectrum 205 in FIG. 2. Although such dithering is effective with regard to lowering the peak EMI magnitudes, there are applications such as capacitive sensing in the touch screens of smartphones and tablet computers that require very low noise emissions in certain sections of the frequency spectrum.

Accordingly, there is a need in the art for improved valley mode switching techniques with reduced EMI peak amplitudes while retaining frequency bands with virtually no EMI.

SUMMARY

An adaptive valley mode switching scheme is provided in which a controller is configured to determine valley periods for each cycle of a resonant oscillation for a power switch terminal. Each valley period for each resonant oscillation cycle occurs when the power switch terminal voltage falls below a valley threshold voltage. Rather than switching on the power switch at a valley minimum as is conventional in a valley mode switching scheme, the adaptive valley mode switching scheme disclosed herein switches on the power switch at an adaptive valley switch on time that is randomly varied across a selected one of the valley periods. In this fashion, the resulting EMI amplitude at the switching frequency and its harmonics is lowered without the noise invading adjacent frequency bands as results from the skipping of valley minimums in conventional valley mode switching schemes. Instead, the controller determines a desired switch turn on time and also determines a corresponding valley period. The controller then randomly dithers across the corresponding valley period to select an adaptive valley mode switch on time at which the power switch is cycled on.

These advantageous features may be better appreciated through a consideration of the detailed description below.

BRIEF DESCRIPTION OF THE DRAWINGS

FIG. 6 illustrates a DC-to-DC switching power converter configured to practice adaptive valley mode switching.

Embodiments of the present disclosure and their advantages are best understood by referring to the detailed description that follows. It should be appreciated that like reference numerals are used to identify like elements illustrated in one or more of the figures.

DETAILED DESCRIPTION

To decrease the peak EMI noise amplitudes while assuring that the EMI noise is still confined to distinct bands so as to leave the remaining frequency spectrum substantially EMI-free, an adaptive valley mode switching scheme is disclosed. It is termed adaptive since the dithering is adapted to a specific valley. In particular, a switching power converter controller is provided that detects when a current local minimum for the resonant voltage oscillation has begun with regard to a valley threshold voltage. In other words, the controller deems that a current valley has begun when a switch terminal voltage has dropped below the valley threshold voltage. Based upon the frequency for the resonant oscillation, the switch terminal voltage will rise past the valley threshold voltage. The period of time for when the switch terminal voltage is less than the valley threshold voltage is denoted herein as the valley period ($t_{valley}$). The frequency dithering is deemed herein as "adaptive" in that it is adapted to be within the valley period.

Figure 3:
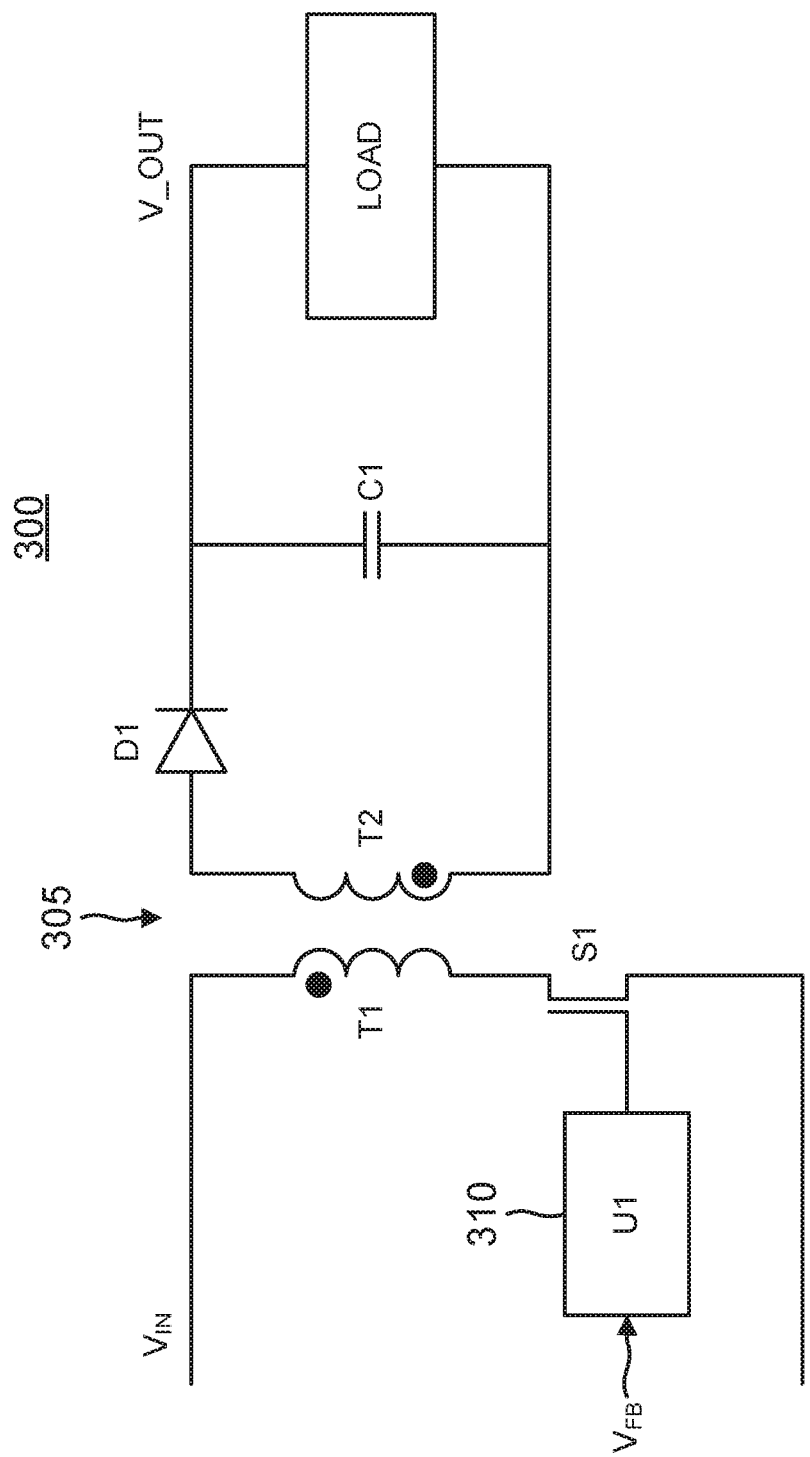
FIG. 3 illustrates a flyback converter configured to practice adaptive valley mode switching.

An example switching power converter configured for adaptive valley mode switching is shown as flyback converter 300 in FIG. 3. However, it will be appreciated that the adaptive valley mode switching systems and techniques disclosed herein are widely applicable to any suitable switching power converter such as a buck or boost converter. In flyback converter 300, a rectified input voltage Vin drives a magnetizing current into a first terminal of a primary winding T1 of a transformer 305 when a controller 310 (U1) cycles an NMOS power switch transistor S1 on. The source of power switch transistor S1 couples to ground whereas its drain couples to a remaining second terminal of primary winding T1. The resulting magnetic energy buildup in transformer 305 upon the closure of power switch transistor S1 causes a secondary winding T2 of transformer 305 to forward bias an output diode D1 and charge a filter capacitor C1 providing an output voltage Vout across a load. Controller 310 receives a feedback voltage VFB that is representative of the output voltage to control the cycling of power switch S1 so as to regulate the output voltage at the desired value. For example, transformer 305 may include an auxiliary winding (not illustrated) from which the feedback voltage is derived as known in the primary-only feedback arts. Alternatively, controller U1 may receive the feedback voltage indirectly from the load through, for example, an opto-isolator. Controller 310 may use the feedback voltage to regulate the output voltage using control algorithms such as a proportional-integral (PI) or a proportional-integral-derivative (PID) as known in the switching power converter arts.

Regardless of the particular control algorithm implemented by controller U1, it will determine a desired switch on time accordingly. For example, the desired switch on time for each switching cycle of power switch transistor S1 may be determined responsive to a clock signal. This desired switch on time has no relationship to the resonant oscillation of the drain voltage for power switch transistor S1 that occurs after a magnetizing current flows through primary winding T1 and a subsequent switching off of power switch transistor S1. To lower the resulting EMI peak amplitudes without excessive spreading of the resulting EMI spectrum into frequency bands adjacent the switching frequency (and its harmonics), controller U1 is configured to implement an adaptive valley mode switching.

Figure 4:
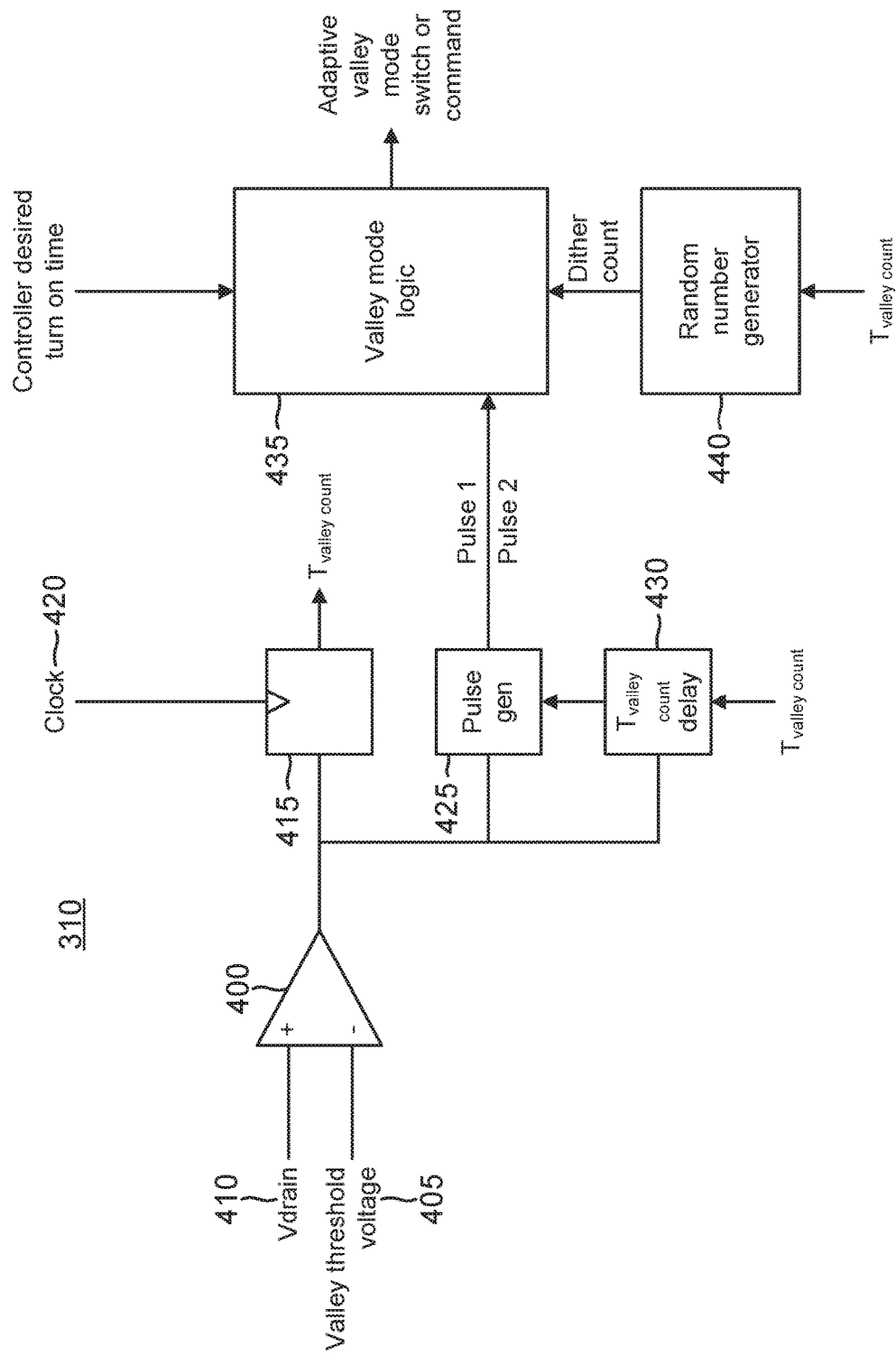
FIG. 4 is a circuit diagram of a switching mode power controller configured to practice adaptive valley mode switching.
Figure 5:
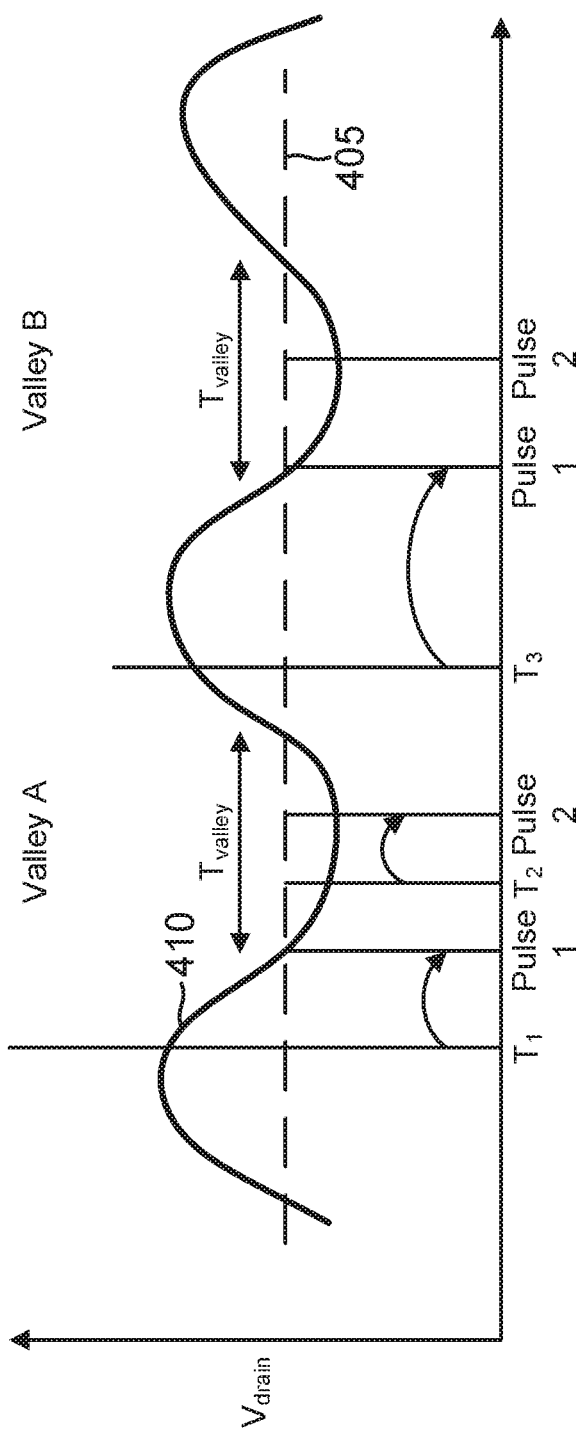
FIG. 5 illustrates a waveform for the resonant oscillations of the switch terminal voltage and the corresponding valley threshold voltage for the flyback converter of FIG. 3.

For example, controller 310 may include a valley mode comparator 400 as shown in FIG. 4 that is configured to assert an output signal low to ground responsive to a drain voltage (Vdrain) 410 for power switch transistor S1 (FIG. 3) being less than a valley threshold voltage 405. A valley A and a consecutive valley B for the resonant oscillation of drain voltage 410 is shown in FIG. 5. In each valley, drain voltage 410 drops below valley threshold voltage 405 for the valley period ($T_{valley}$). Referring again to FIG. 4, a counter 415 counts the duration of the valley period with regard to cycles of a clock 420 to produce a count ($T_{valley}$ count) that represents the duration of the valley period $T_{valley}$ in clock cycles of clock 420. A pulse generator 425 generates a pulse (pulse 1) responsive to the output signal of comparator 400 being asserted low. Note that a logic high assertion may be used in alternative embodiments. Moreover, comparator 400 may be a digital or analog comparator.

Referring to FIG. 5, a pulse 1 is thus triggered at the beginning of the valley period $T_{valley}$ for both valley A and valley B. In addition, pulse generator 425 generates a second pulse (pulse 2) for each valley that represents the valley minimum time (the midpoint of the valley period $T_{valley}$). For example, the output signal of comparator 400 may be delayed in a delay circuit 430 by ½ of $T_{valley}$ count. Pulse generator 425 generates each pulse 2 responsive to being triggered by an asserted output from counter 430. A valley mode logic circuit 435 receives the power switch transistor desired turn on time. As discussed previously this desired switch on time comes from the control loop implemented by controller 310 and is thus independent of the resonant oscillations of drain voltage 410.

Valley mode logic circuit 435 compares the desired turn on time to pulses 1 and 2 to determine an adaptive valley mode switch on command responsive to a dither count from a random (or pseudorandom) number generator 440. The dither count is a random number that ranges between zero and ½ of $T_{valley}$ count. For example, if $T_{valley}$ count is 20 clock cycles, the dither count may vary randomly from zero to 10 clock cycles. The controller desired turn on time is also defined with regard to cycles of clock 420. To keep the adaptive valley mode switch on time within the appropriate valley period, valley mode logic circuit 435 compares the desired switch on time to the times when pulses 1 and 2 are asserted for a given resonant oscillation cycle. Each pulse is deemed to occur at some cycle of clock 420. For example, a first desired switch on time T1 is shown in FIG. 5 that occurs before pulse 1 of valley A. Valley mode logic circuit 435 then adds the dither count to the clock time for the pulse 1 of valley A to form the adaptive valley mode switch on command that will range from the beginning of the valley period for valley A up to the mid-point of the valley period.

Another example desired switch on time T2 occurs after pulse 1 of valley A but on or before pulse 2 of valley A. Valley mode logic circuit 435 responds to this determination by adding the dither count to the clock time for pulse 2 of valley A. In this fashion, valley mode logic circuit 435 eithers dithers with regard to the beginning of the valley period or the mid-point of the valley period. In either case, the resulting dithering is guaranteed to be within the corresponding valley period and is thus adapted to that valley period. On the other hand, suppose that a desired switch on time T3 occurs after pulse 2 of valley A but before the pulse 1 of valley B as shown in FIG. 5. Valley mode logic circuit 435 responds to such timing of the desired switch on time by dithering with regard to pulse 1 of the valley period for valley B.

It will be appreciated that the resulting timing logic implemented by valley mode logic circuit 435 is to determine whether the desired switch on time falls after the pulse 2 for a current valley period. If so, the dithering is applied to the subsequent pulse 1 if the desired switch on time falls between the previous pulse 2 and the subsequent pulse 1. On the other hand, the dithering is applied to the subsequent pulse 2 if the desired switch on time falls between the subsequent pulse 1 and the subsequent pulse 2. It will be appreciated that alternative timing logic limits may be applied to pulses 1 and 2 to ensure that the dithered switch on time falls within the appropriate valley period. Valley threshold voltage 405 is selected so that the switching on within the valley period is at a sufficiently low voltage so as to provide an acceptable device strain and noise level.

As noted earlier, the adaptive valley mode switching principles disclosed herein are not limited to a flyback architecture. For example, a buck-boost power converter 600 as shown in FIG. 6 may include a controller 610 configured to implement adaptive valley mode switching for an NMOS power switch transistor S2. In buck-boost converter 600, a rectified input voltage V_IN is received at a first terminal of an inductor L1 and a resistor R1. For example, a bridge rectifier (not illustrated) or other suitable AC-to-DC rectifier may rectify the AC input voltage from an AC mains to provide rectified input voltage that is processed through a phase-cut dimming switch (not illustrated) to produce rectified input voltage V_IN.

Buck-boost converter 600 includes a cascode transistor S3 (e.g., an NMOS transistor) that has its gate coupled to a second terminal of resistor R1 at a node 605. The source of cascode transistor S3 couples to a drain of power switch transistor S2 (having a gate voltage controlled by a controller 610). Cascode transistor S3 isolates power switch S2 from the relatively high voltage for rectified input voltage V_IN. An output diode D1 and an output capacitor C2 filter the power delivery from inductor L1 to a load such as a light emitting diode (LED1).

Figure 1:
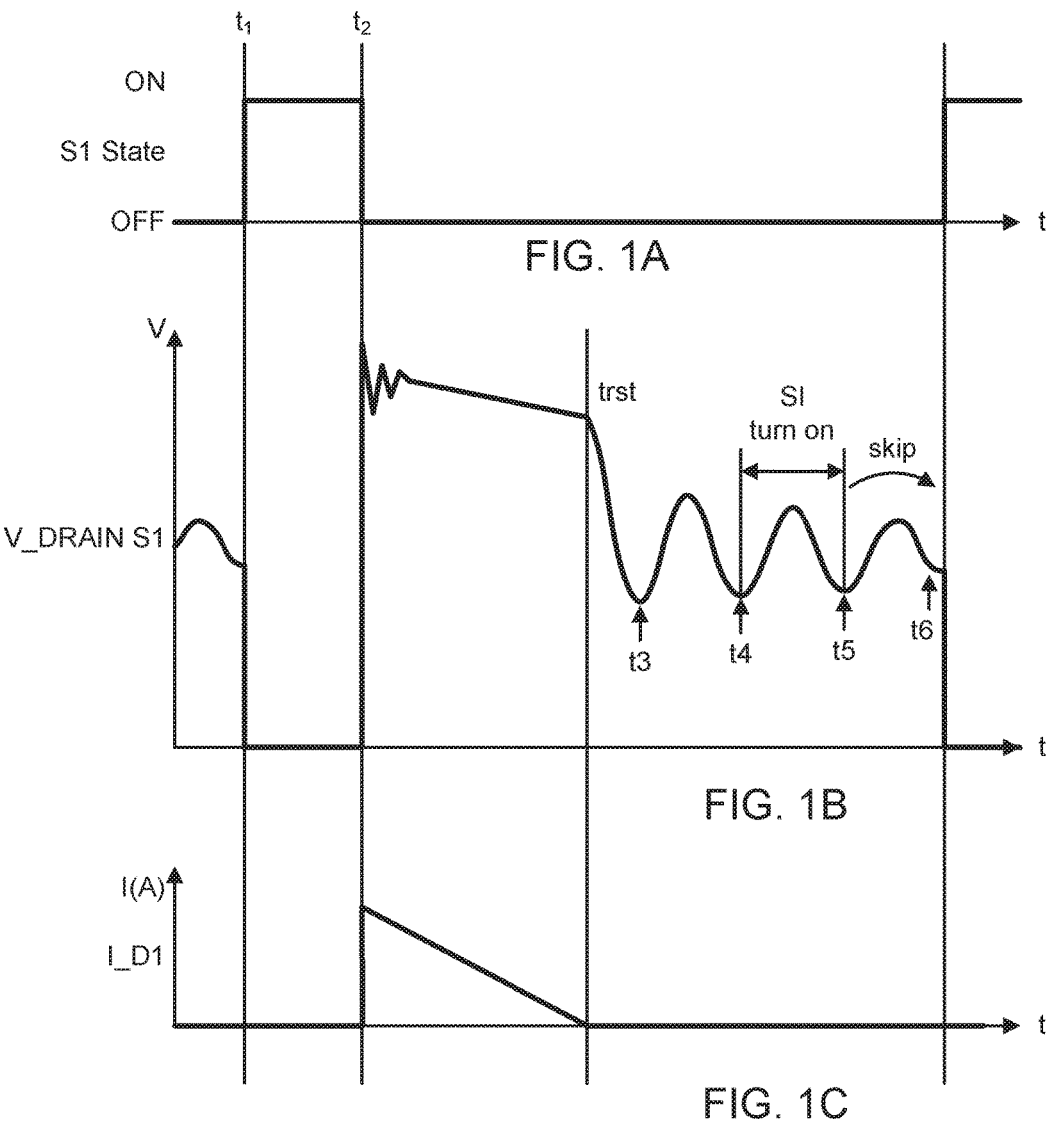
FIG. 1A is a waveform for switch on times for a power switch in a conventional switching power converter.
FIG. 1B is a voltage waveform for a terminal of the power switch of FIG. 1A.
FIG. 1C is a current waveform for a secondary winding in the switching power converter of FIG. 1A.
Figure 2:
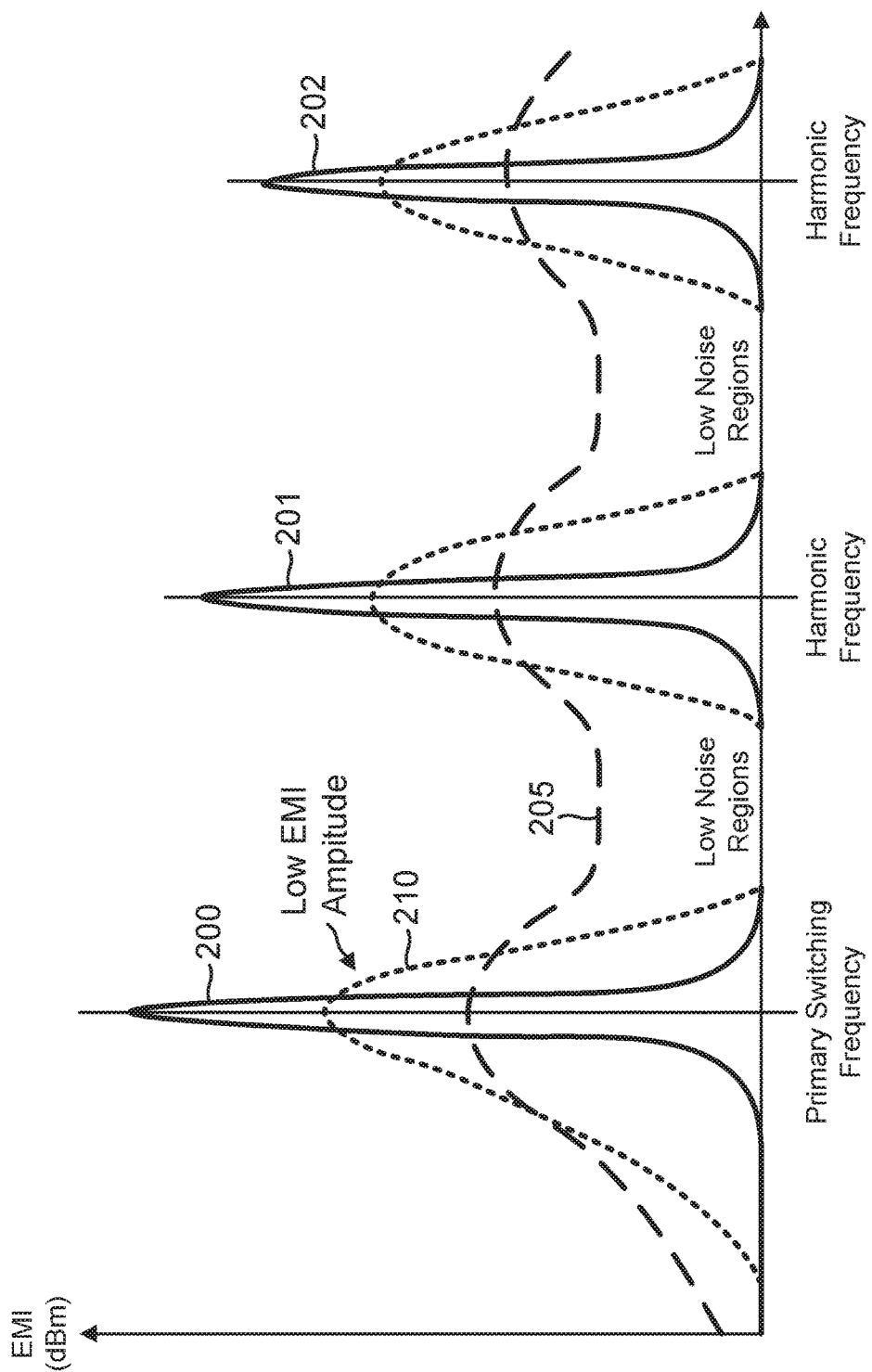
FIG. 2 illustrates the EMI noise spectrums for a conventional switching power converter using valley mode switching with and without frequency dithering.

The resulting adaptive valley mode switching is quite advantageous as it lowers the peak EMI noise amplitudes without excessive spreading of the EMI spectrum into bands adjacent the switching frequency and its harmonics. Referring again to FIG. 2, an example adaptive valley mode switching EMI spectrum 210 is shown. Note that the low noise regions adjacent the peak EMI amplitudes 200, 201, and 202 have virtually no EMI noise present since the dithering in an adaptive valley mode converter is limited to the valley periods as discussed earlier without the excessive spreading that occurs from conventional valley skipping.

Those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

The invention claimed is:

1. A switching power converter, comprising:
    a power switch, wherein the switching power converter is configured to generate a resonant voltage oscillation at a terminal of the power switch when the power switch is cycled off, and
    a controller configured to cycle the power switch on and off to regulate an output voltage, the controller being further configured to determine a desired switch on time for a given cycle of the power switch, wherein the controller includes:
    a comparator configured to compare the terminal voltage for the power switch to a valley threshold voltage to determine a valley period time of a valley period for each resonant cycle of the terminal voltage in which the terminal voltage is less than the valley threshold voltage, wherein each valley period is divided into a first half that begins at a beginning of the valley period and into a remaining second half that ends at an end of the valley period, and wherein a current valley period is followed by a subsequent valley period;
    a valley mode logic circuit configured to adapt the desired switch on time into an adaptive valley mode switch on time by dithering the adaptive valley mode switch on time across:
        the first half of the current valley period when the desired switch on time is prior to a beginning of the current valley period;
        the second half of the current valley period when the desired switch on time is after the beginning of the current valley period and prior to a beginning of the second half for the current valley period, and
        the first half of the subsequent valley period when the desired switch on time is after the beginning of the second half for the current valley period and prior to a beginning of the subsequent valley period.

2. The switching power converter of claim 1, wherein the comparator further includes a counter configured to count a valley period count for each valley period.

3. The switching power converter of claim 2, wherein the comparator further includes a random number generator configured to generate, for each cycle of the power switch, a random number from zero to no more than one half of the valley period count.

4. The switching power converter of claim 1, wherein the comparator further comprises at least one pulse generator configured to pulse a first pulse responsive to a beginning of each valley period and to pulse a second pulse responsive to a mid-point of the each valley period, and wherein the valley mode logic circuit is configured to dither with regard to the first pulse when the desired switch on time occurs before the first pulse time for the current valley period.

5. The switching power converter of claim 4, wherein the pulse generator is further configured to dither with regard to the second pulse when the desired switch on time occurs after the first pulse and before the second pulse for the current valley period.

6. The switching power converter of claim 4, wherein the at least one pulse generator comprises a single pulse generator.

7. The switching power converter of claim 1, wherein the switching power converter comprises a flyback converter.

8. The switching power converter of claim 1, wherein the switching power converter comprises a DC-DC switching power converter.

9. The switching power converter of claim 8, wherein the DC-DC switching power converter is a buck-boost converter.

10. A switching power converter method, comprising:
cycling a power switch on and off to regulate an output voltage and to generate a resonant voltage oscillation at a terminal of the power switch responsive to the power switch being switched off, wherein each resonant voltage oscillation includes a valley period in which the terminal voltage falls below a valley threshold voltage, and wherein each valley period is divided into a first half that begins at a beginning of the valley period and into a second half that ends at an end of the valley period, and wherein a current valley period is followed by a subsequent valley period;
adapting a desired switch on time for the current valley period into an adaptive valley mode switch on time by dithering the adaptive valley mode switch on time across:
the first half of the current valley period when the desired switch on time is prior to a beginning of the current valley period;
the second half of the current valley period when the desired switch on time is after the beginning of the current valley period and prior to a beginning of the second half for the current valley period; and
the first half of the subsequent valley period when the desired switch on time is after the beginning of the second half for the current valley period and prior to a beginning of the subsequent valley period.

11. The switching power converter method of claim 10, wherein the dithering of the desired switch on time does not skip into another valley period following the subsequent valley period.

12. The switching power converter method of claim 10, wherein cycling the power switch comprises cycling an NMOS power switch transistor of a flyback converter.

13. The switching power converter method of claim 10, wherein cycling the power switch comprises cycling an NMOS power switch transistor of a DC-to-DC converter.

14. The switching power converter method of claim 13, wherein cycling the power switch of the DC-to-DC converter comprises cycling an NMOS power switch transistor of a buck-boost converter.

15. The switching power converter method of claim 10, further comprising counting a total number of clock cycles across each valley period.

16. The switching power converter method of claim 10, further comprising generating a pulse at the beginning of each valley period and at a midpoint of each valley period.

* * * * *